(12) United States Patent
Yoon

(10) Patent No.: US 8,744,259 B2
(45) Date of Patent: Jun. 3, 2014

(54) POP-UP FLASH ASSEMBLY AND CAMERA INCLUDING THE SAME

(71) Applicant: Samsung Electronics Co., Ltd., Suwon-si (KR)

(72) Inventor: Tae-jin Yoon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/693,230

(22) Filed: Dec. 4, 2012

(65) Prior Publication Data

US 2013/0259461 A1 Oct. 3, 2013

(30) Foreign Application Priority Data

Mar. 30, 2012 (KR) .......................... 10-2012-0033346

(51) Int. Cl.
*G03B 15/03* (2006.01)
*H04N 5/222* (2006.01)

(52) U.S. Cl.
USPC ................ 396/177; 396/165; 348/371; 362/3

(58) Field of Classification Search
USPC .................. 396/155, 165, 174–178; 348/371; 362/3, 18
See application file for complete search history.

(56) References Cited

U.S. PATENT DOCUMENTS

2010/0284676 A1* 11/2010 Shintani et al. ............... 396/175

* cited by examiner

*Primary Examiner* — Rochelle-Ann J Blackman
(74) *Attorney, Agent, or Firm* — Drinker Biddle & Reath LLP

(57) ABSTRACT

A pop-up flash assembly including a main body comprising an opening; a moving unit linearly movable between a first position and a second position, wherein the moving unit is received in the opening at the first position and protrudes from the opening at the second position; a flash installed on the moving unit and generates light; a first link that has an end that is rotatably coupled to the main body; a second link that has an end that is rotatably coupled to another end of the first link, and another end of the second link being rotatably coupled to the moving unit; and a driver for rotating the first link.

20 Claims, 9 Drawing Sheets

POP-UP FLASH ASSEMBLY AND CAMERA INCLUDING THE SAME

CROSS-REFERENCE TO RELATED PATENT APPLICATION

This application claims the benefit of Korean Patent Application No. 10-2012-0033346, filed on 30 Mar. 2012, in the Korean Intellectual Property Office, the disclosure of which is incorporated herein in its entirety by reference.

BACKGROUND

Field of the Invention

Various embodiments relate to a pop-up flash assembly and a camera including the same, and more particularly, to a pop-up flash assembly with a maximum flash pop-up stroke by using a link mechanism and a camera including the pop-up flash assembly.

A pop-up flash of a camera is a light-emitting device that is embedded in a main body of the camera, and when photographing is performed and it is necessary for light to be emitted from the flash, the pop-up flash pops up so as to protrude from the main body of the camera.

Recently, small and slim cameras have become more common. To mount a pop-up flash on such small and slim cameras, the pop-up flash needs to be designed to have a simple structure that occupies a minimum space.

The pop-up flash improves photographing by providing light required for photographing. When the pop-up flash emits light toward a subject, a shadow may be formed due to the overlapping of a progressing path of light and the structure of the main body of a camera. To prevent the shadow, the pop-up flash needs to be appropriately located.

Japanese Registered Patent Publication No. JP3998824 discloses a pop-up flash protruding from a camera. However, in the camera, constituent elements that are used to form a mechanism to make the pop-up flash protrude take up much room. That is, since the pop-up flash rotates so as to protrude from the camera, that design requires space for rotational motion of the pop-up flash or requires space for the rotational motion of the constituent elements supporting the pop-up flash. Thus, it is difficult to obtain a compact camera design. Also, during the pop-up motion of the pop-up flash, noise may occur due to contact between constituent components, and the number of parts used to implement the rotational motion increases, thereby complicating the assembly process.

SUMMARY

Various embodiments of the invention provide a pop-up flash assembly having a compact structure that is suitable for small and slim cameras, and a camera including the same.

The embodiments also provide a pop-up flash assembly in which the noise of a pop-up motion is reduced, and a camera including the same.

The embodiments also provide a pop-up flash assembly that has a simple slim structure and uses a small number of parts, and a camera including the same.

According to an embodiment, there is provided a pop-up flash assembly including: a main body including an opening; a moving unit that is arranged in the main body in such a manner that the moving unit linearly moves in a direction in which the opening extends and is movable between a first position and a second position, wherein the moving unit is received in the opening at the first position and the moving unit protrudes from the opening at the second position; a flash that is installed on the moving unit and generates light; a first link that has an end that is rotatably coupled to the main body; a second link that has an end that is rotatably coupled to another end of the first link, and another end of the second link being rotatably coupled to the moving unit; and a driver for rotating the first link.

The end of the first link may be rotatably coupled to a rotational axis of the main body, and the driver includes a first spring that is installed between the end of the first link and the rotational axis to provide a rotational force to the first link.

The driver may further include a second spring that is installed between the first link and the second link to provide a rotational force between the first link and the second link.

The pop-up flash assembly may further include a stopper that is installed on the main body in such a manner that the stopper is movable between a coupling position in which the stopper is coupled to the moving unit to limit the motion of the moving unit in the opening and a separation position in which the stopper is separated from the moving unit.

The stopper may include a protrusion that is movable to protrude toward the opening through a coupling hole formed in a wall of the opening, and an elastic support that elastically supports the protrusion with respect to the main body.

The end of the first link may be connected to the rotational axis of the main body, and the driver may include a driving motor for rotating the rotational axis.

The driver may further include a power transmitting unit that is coupled between the driving motor and the rotational axis to transmit a driving force.

The pop-up flash assembly may further include: a third link that has an end that is rotatably coupled to the main body and rotates about a direction crossing a rotational axis of the first link; and a fourth link that has an end that is rotatably coupled to another end of the third link and another end of the fourth link being rotatably coupled to the moving unit, and rotates about a direction crossing a rotational axis of the first link.

The moving unit may further include an extension hole supporting the other end of the fourth link to allow the other end of the fourth link to slide while rotating.

According to another embodiment, there is provided a camera including: a pop-up flash assembly including: a main body including an opening; a moving unit that is arranged in the main body in such a manner that the moving unit linearly moves in a direction in which the opening extends and is movable between a first position and a second position, wherein the moving unit is received in the opening at first position and the moving unit protrudes from the opening at the second position; a flash that is installed on the moving unit and generates light; a first link that has an end that is rotatably coupled to the main body; a second link that has an end that is rotatably coupled to another end of the first link, and another end of the second link being rotatably coupled to the moving unit; and a driver for rotating the first link; a controller that is disposed on the main body and transfers signals to the flash; and a signal transferring unit that electrically connects the controller and the flash, and transfers signals from the controller to the pop-up flash assembly.

BRIEF DESCRIPTION OF THE DRAWINGS

The above and other features and advantages will become more apparent by describing in detail exemplary embodiments thereof with reference to the attached drawings in which.

DETAILED DESCRIPTION

Hereinafter, structures and operations of pop-up flash assemblies and cameras including the pop-up flash assemblies according to various embodiments are described in detail.

Figure 1:
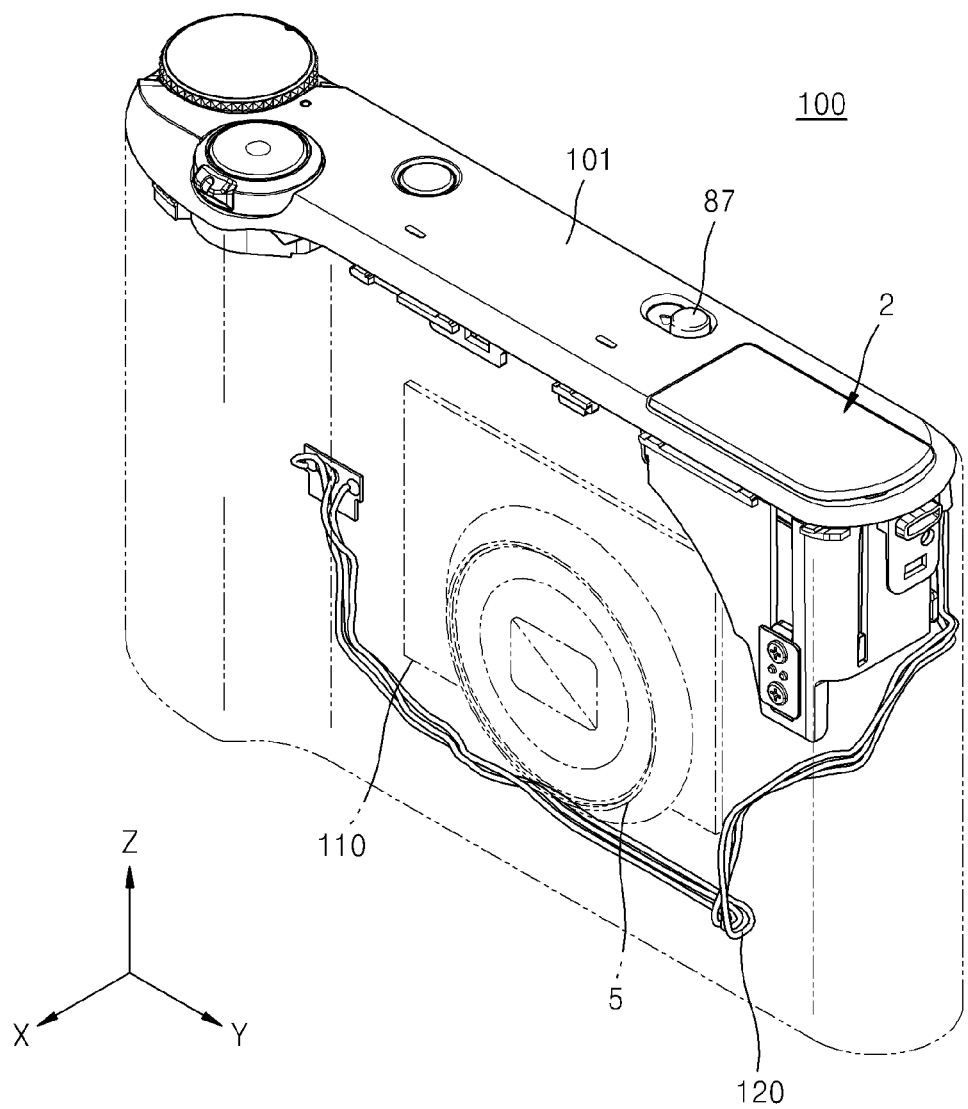
FIG. 1 is a schematic perspective view of a camera including a pop-up flash assembly according to an embodiment, in which only a portion of an inner structure of the camera is illustrated.

FIG. 1 is a schematic perspective view of a camera 100 including a pop-up flash assembly 2 according to an embodiment, in which only a portion of an inner structure of the camera is illustrated.

The camera 100 includes a pop-up flash assembly 2, a controller 110 for controlling the pop-up flash assembly 2, and a signal transferring unit 120 that electrically connects the controller 110 to the pop-up flash assembly 2 to transfer signals from the controller 110 to the pop-up flash assembly 2. The controller 110 and the signal transferring unit 120 are located within a housing 101 of the camera 100, and the pop-up flash assembly 2 is located on an upper side of the housing 101. The camera 100 includes a lens portion 5 for receiving light corresponding to an image.

The camera 100 may be embodied as, for example, a digital still camera for capturing a still image or a digital video camera for capturing a moving image or video.

The housing 101 of the camera 100 may cover, protect, and support various constituent elements of the camera 100.

The controller 110 is electrically connected to the pop-up flash assembly 2, and transmits control signals to and may receive signals from the pop-up flash assembly 2 so as to control the pop-up flash assembly 2, or processes data.

The controller 110 may be embodied as a micro chip, or a circuit board including a micro chip, and elements that constitute the controller 110 may be embodied as software or as circuits located inside the controller 110.

In FIG. 1, the signal transferring unit 120 is embodied as a flexible set of wires. However, the signal transferring unit 120 is not limited thereto. For example, the signal transferring unit 120 may be embodied as a flexible or hard printed circuit board that electrically connects the pop-up flash assembly 2 to the controller 110, or may be embodied using wireless communication technology.

Figure 2:
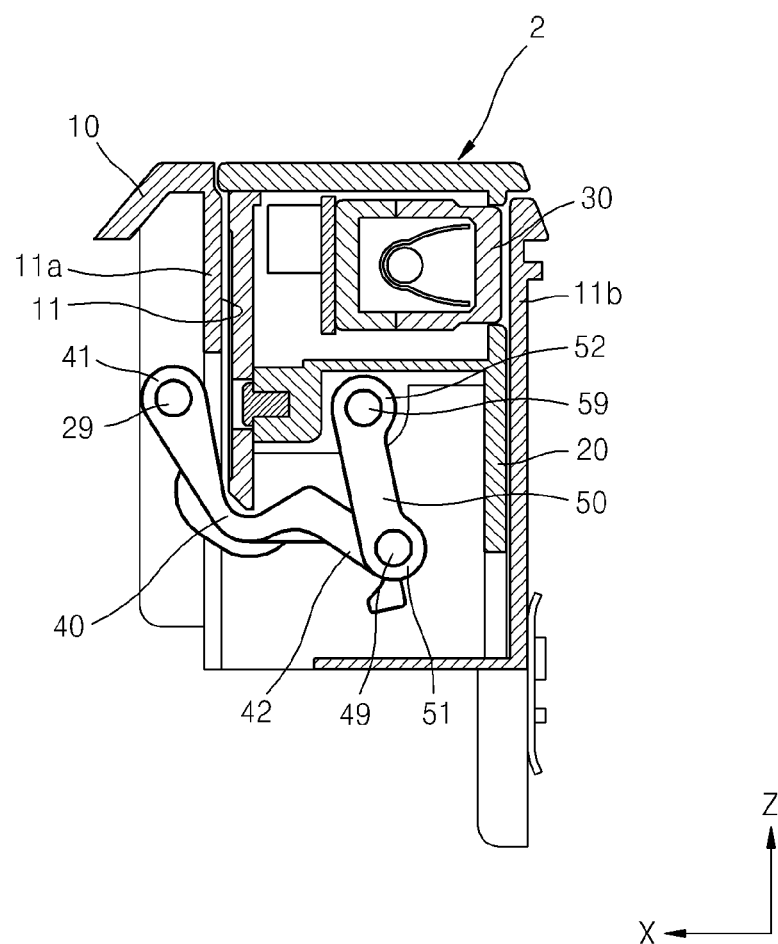
FIG. 2 is a side cross-sectional view of the pop-up flash assembly of the camera of FIG. 1.
Figure 5:
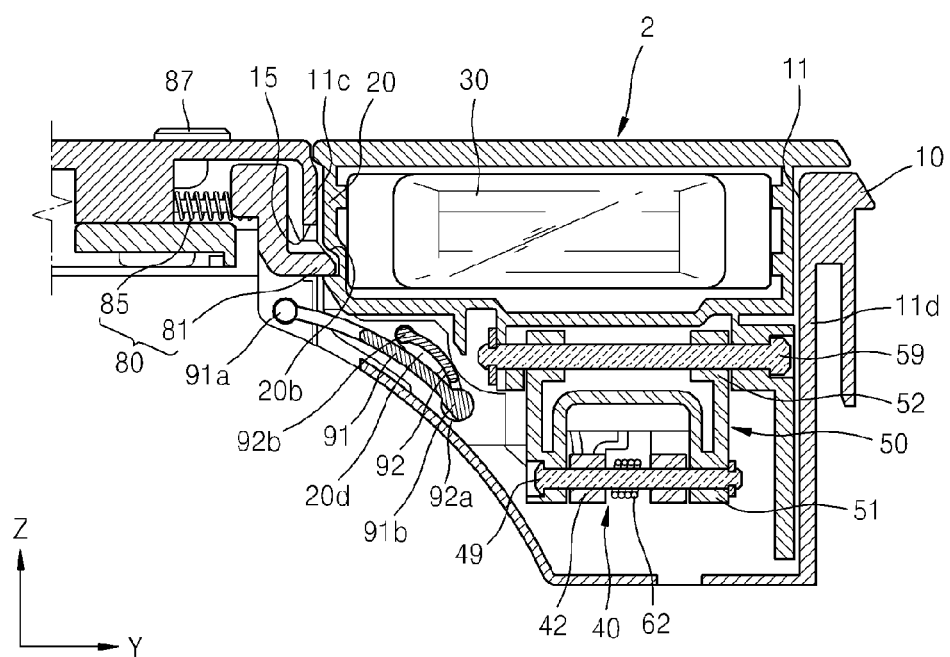
FIG. 5 is a front cross-sectional view of the pop-up flash assembly of FIG. 2.
Figure 6:
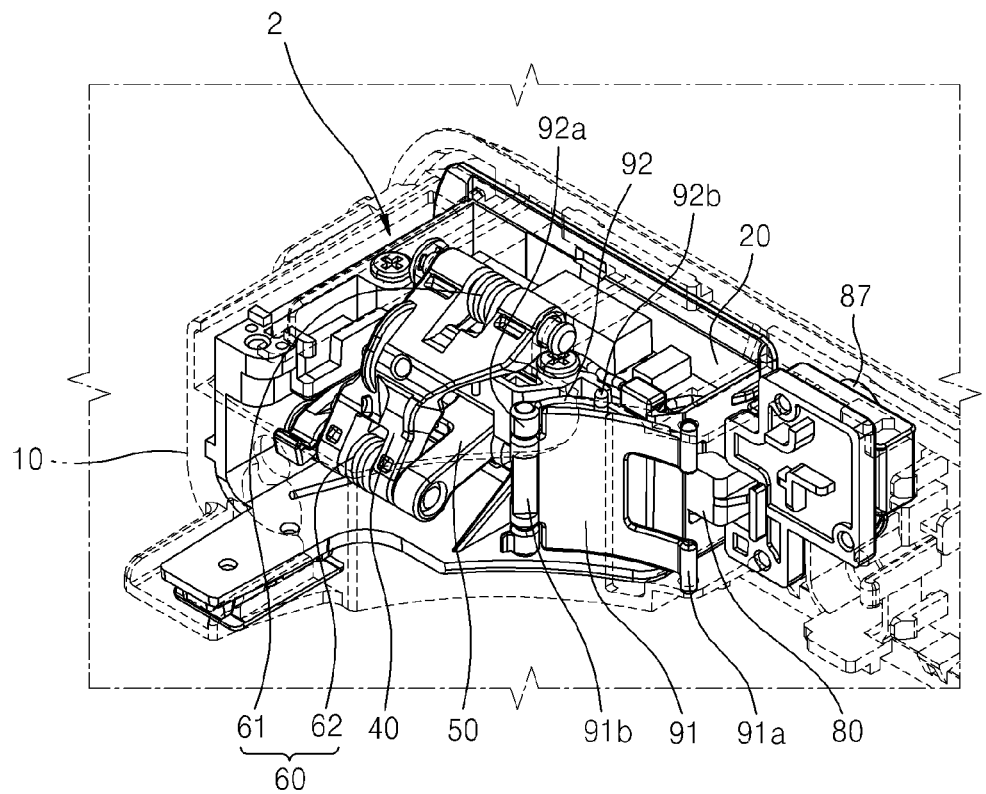
FIG. 6 is a perspective view of the pop-up flash assembly of FIG. 2.

The pop-up flash assembly 2 according to embodiments illustrated in FIGS. 2 and 5, includes a main body 10 including an opening 11, a moving unit 20 that is movably installed in the main body 10 to allow the moving unit 20 to be received in the main body 10 or to protrude from the main body 10, a flash 30 that is installed on the moving unit 20 and generates light, a first link 40 that moves the moving unit 20 with respect to the main body 10, a second link 50, and a driver 60.

The opening 11 may be embodied as a passage having a rectangular shape formed by walls 11a, 11b, 11c, and 11d of the main body 10. The moving unit 20 is movably arranged in the opening 11, and may linearly move upwards or downwards along a z axis, which is a direction in which the opening 11 extends. The moving unit 20 may be movable between a first position and a second position, wherein the first position is a position in which the moving unit 20 protrudes from the opening 11, and the second position is a position in which the moving unit 20 received or retracted in the opening 11. FIGS. 1 to 5 illustrate when the moving unit 20 is retracted in the opening 11, that is, the moving unit 20 is located in the second position.

The flash 30 for generating light may be located within the moving unit 20. The moving unit 20 may include an edge unit 21 for supporting the flash 30, and a cover unit 22 that is coupled to a side surface of the edge unit 21 to cover the flash 30. When the moving unit 20 moves along the opening 11, the flash 30 also moves along with the moving unit 20. Accordingly, the flash 30 either protrudes from the opening 11 or is embedded in the opening 11. The flash 30 may emit light when signals are applied thereto through an interconnection line 31.

Regarding the pop-up flash assembly 2, when the camera 2 is not used or flash light is not needed, the moving unit 20 and the flash 30 are embedded in the opening 11, that is, the moving unit 20 and the flash 30 are located in the second position. The second position refers to a position when the pop-up flash assembly 2 is retracted in the housing 101 of the camera 2. When night photographing or backlight photographing is performed using the camera 2, the moving unit 20 and the flash 30 move to the first position in which they protrude from the opening 11 and the flash 30 emits light. The first position is a position in which the pop-up flash assembly 2 may emit light.

The first link 40 has an end 41 that is rotatably coupled to the main body 10, and another end 42 coupled to the second link 50. The first link 40 may rotate about a first rotational axis 29 of the main body 10.

The driver 60 rotates the first link 40. In the illustrated embodiment, the driver 60 may include a first spring 61 that is embodied as a torsion spring. The first spring 61 is installed between the main body 10 and the first link 40, and provides force to the first link 40 to rotate the first link 40 with respect to the main body 10. The first spring 61 according to the present embodiment is not limited to a torsion spring, and may instead be embodied using various mechanical elements such as a planar spring, a motor that actuates according to electric signals, a pneumatic cylinder, or the like.

The second link 50 may have an end 51 that is rotatably coupled to the other end 42 of the first link 40 through a second rotational axis 49. Also, the second link 50 may have another end 52 that is rotatably coupled to the moving unit 20 through a third rotational axis 59.

As described above, in a state in which the first link 40, the main body 10, the second link 50, and the moving unit 20 are rotatably connected to each other, when the first link 40 rotates with respect to the main body 10, a rotational force of the first link 40 is transmitted to the moving unit 20 through the second link 50. Since the motion of the moving unit 20 is limited along the extension direction of the opening 11, the moving unit 20 may move linearly along the extension direction of the opening 11 due to the rotational motion of the first link 40.

The driver 60 may further include a second spring 62 that is installed between the first link 40 and the second link 50 and that provides a rotational force between the first link 40 and the second link 50. Due to the cooperative actuation of the first spring 61 and the second spring 62 of the driver 60, the first link 40 rotates with respect to the main body 10 and the second link 50 rotates with respect to the first link 40, and thus, the pop-up motion of the pop-up flash assembly 2, that is, the protrusion of the moving unit 20 from the opening 11, may be performed quickly and stably.

The main body 10 includes a stopper 80 for limiting the motion of the moving unit 20 in the opening 11. The stopper 80 is disposed in the main body in such a way that the stopper 80 is movable between a coupling position in which the stopper 21 is coupled to the moving unit 20 and a separation position in which the stopper 80 is separated from the moving unit 20 to allow the motion of the moving unit 20, so as to limit the motion of the moving unit 20.

The stopper 80 includes a protrusion 81 that protrudes toward the moving unit 20 through a coupling hole formed in the wall 11c of the opening 11, and an elastic support 85, such as a spring, that elastically supports the protrusion 81 with respect to the main body 10. The stopper 80 includes a button 87 protruding from the main body 10. The stopper 80 may be moved to the coupling position or the separation position by a user manipulating the button 87.

FIG. 5 illustrates when the stopper 80 moves toward the moving unit 20; that is, the stopper 80 is located in the coupling position. Since the protrusion 81 of the stopper 80 is inserted through the coupling hole 20b formed in a side surface of the moving unit 20, the motion of the moving unit 20 is limited by the stopper 80.

When a user pushes the button 87 to the left-hand side in the state illustrated in FIG. 5, the protrusion 81 of the stopper 80 is released from the coupling hole 20b of the moving unit 20 and thus, the moving unit 20 is in a movable state with respect to the opening 11. In this state, since the rotational force of the driver 60 is already affecting the first link 40 and the second link 50, simultaneously with the movement of the stopper 80 toward the separation position, the moving unit 20 moves upwards along the Z axis towards the first position in which the moving unit 20 protrudes from the opening 11.

In this illustrated embodiment, the stopper 80 actuates according to a user's passive manipulation. However, the embodiment is not limited thereto. For example, a stopper driver (not shown) for generating a driving power to move the stopper 80 between the coupling position and the separation position may be provided, and the stopper driver may be controlled by using the controller 110 illustrated in FIG. 1, thereby embodying automatic actuation of the stopper 80.

Figure 3:
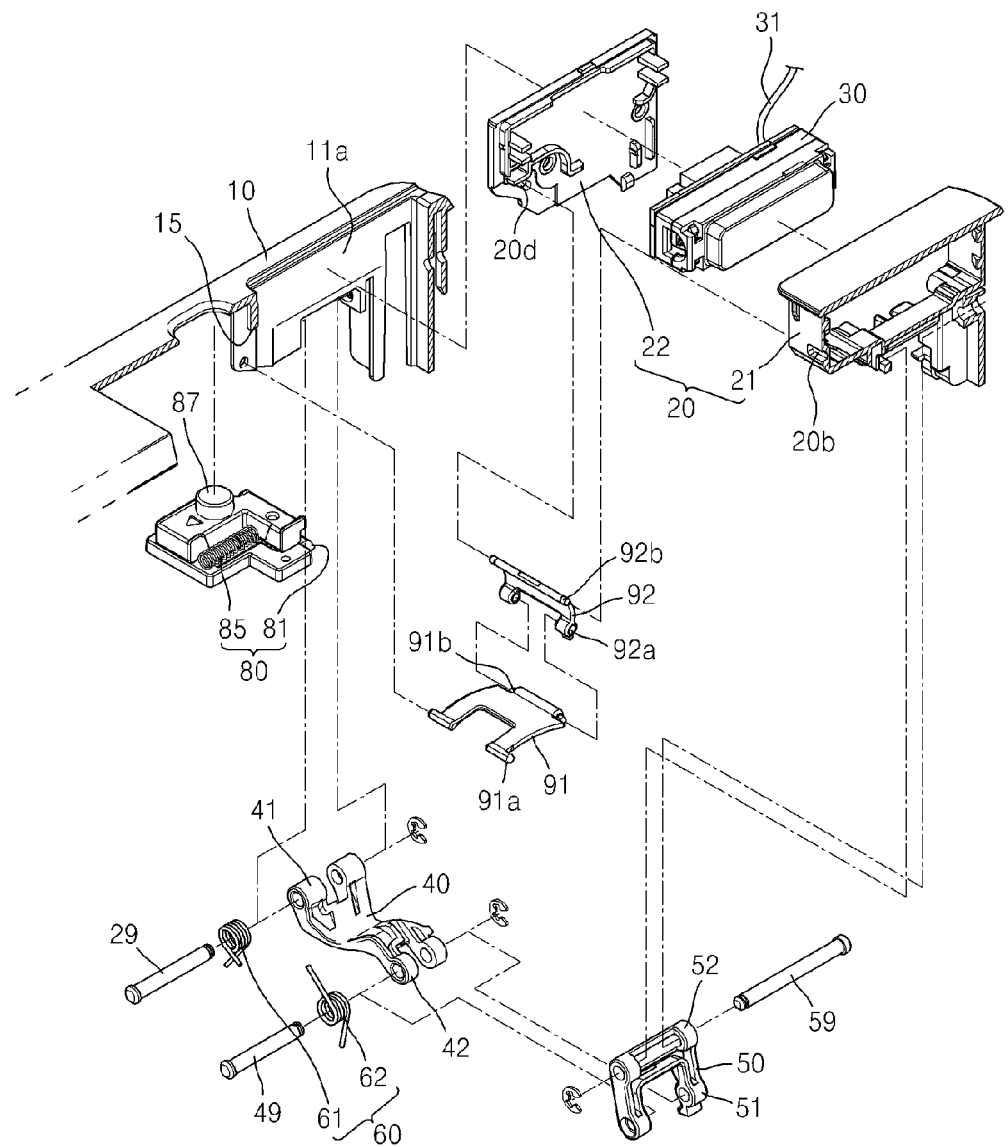
FIG. 3 is an exploded perspective view illustrating the coupling relationship of constituent elements of the pop-up flash assembly of FIG. 2.
Figure 4:
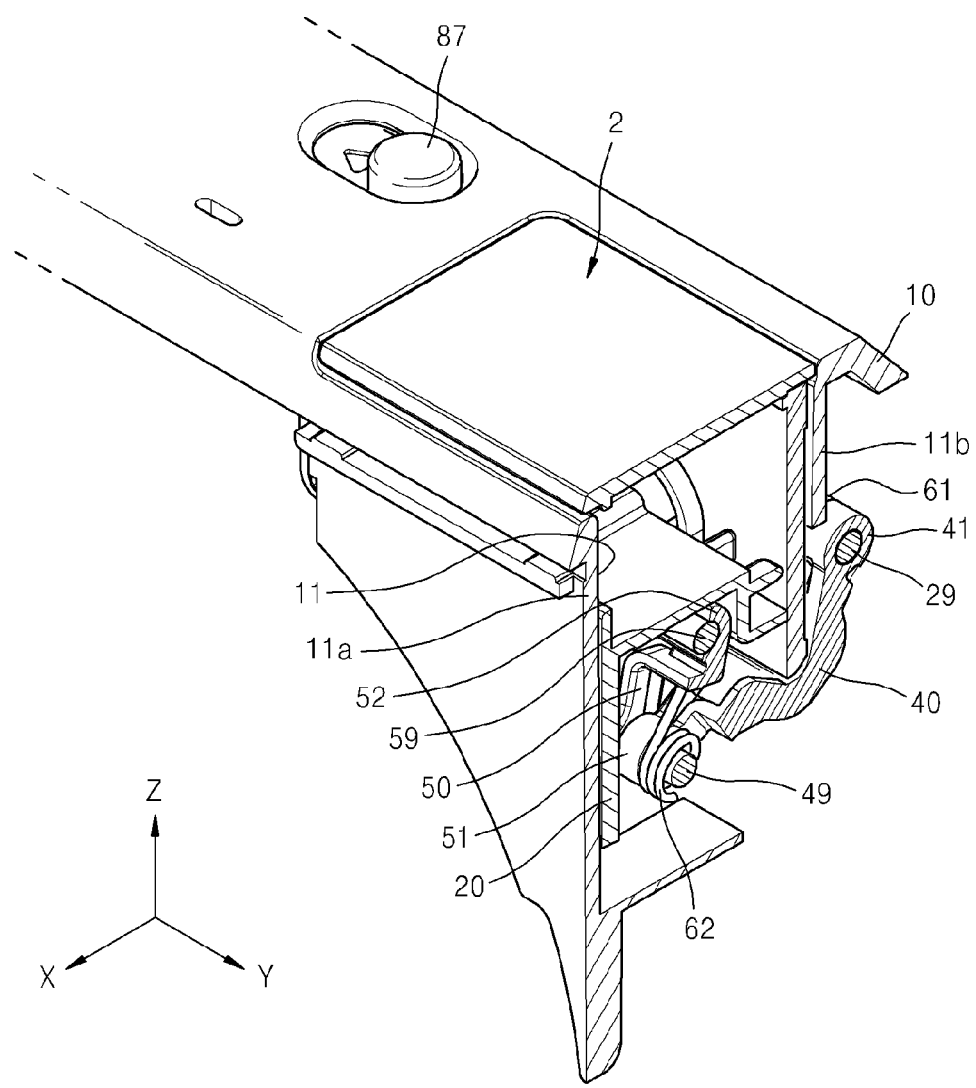
FIG. 4 is a partial perspective cross-sectional view of the pop-up flash assembly of the camera of FIG. 1.

Referring to FIGS. 3 and 5, the pop-up flash assembly 2 may further include a third link 91 that is rotatably coupled to the main body 10 and a fourth link 92 that is rotatably coupled to the moving unit 20.

The third link 91 may have an end 91a that is rotatably coupled to the main body 10, and another end 91b that is rotatably coupled to the fourth link 92. The fourth link 92 may have an end 92a that is rotatably coupled to the other end 91b of the third link 91, and another end 92b that is rotatably coupled to the moving unit 20. The third link 91 and the fourth link 92 may rotate about a direction (a direction parallel to an X axis) crossing a rotational axis (a direction parallel to a Y axis) of the first link 40.

The moving unit 20 may have an extension hole 20d supporting the other end 92b of the fourth link 92. The extension hole 20d of the moving unit 20 may support the other end 92b of the fourth link 92 to allow the other end 92b of the fourth link 92 to slide while rotating when the moving unit 20 actuates.

The third link 91 and the fourth link 92 may maintain the connection between the main body 10 and the moving unit 20 to allow the moving unit 20 to stably actuate.

Figure 7:
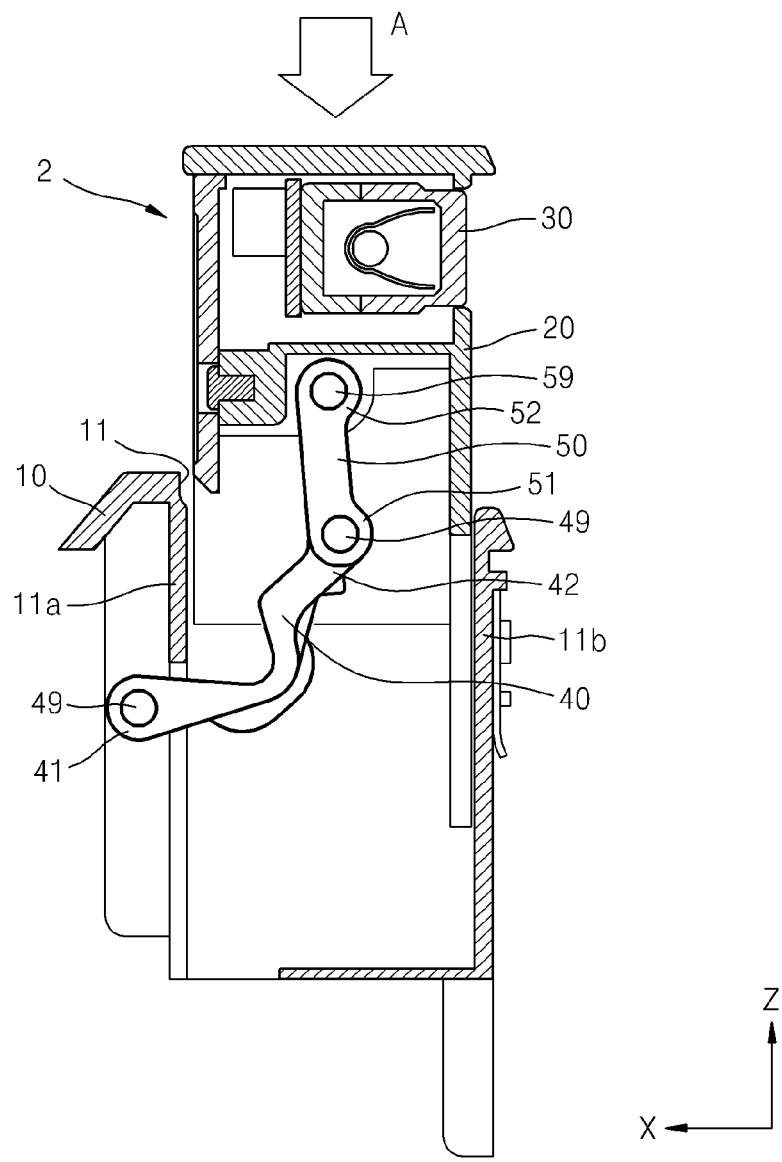
FIG. 7 is a side cross-sectional view of the pop-up flash assembly of FIG. 2 during actuation.
Figure 8:
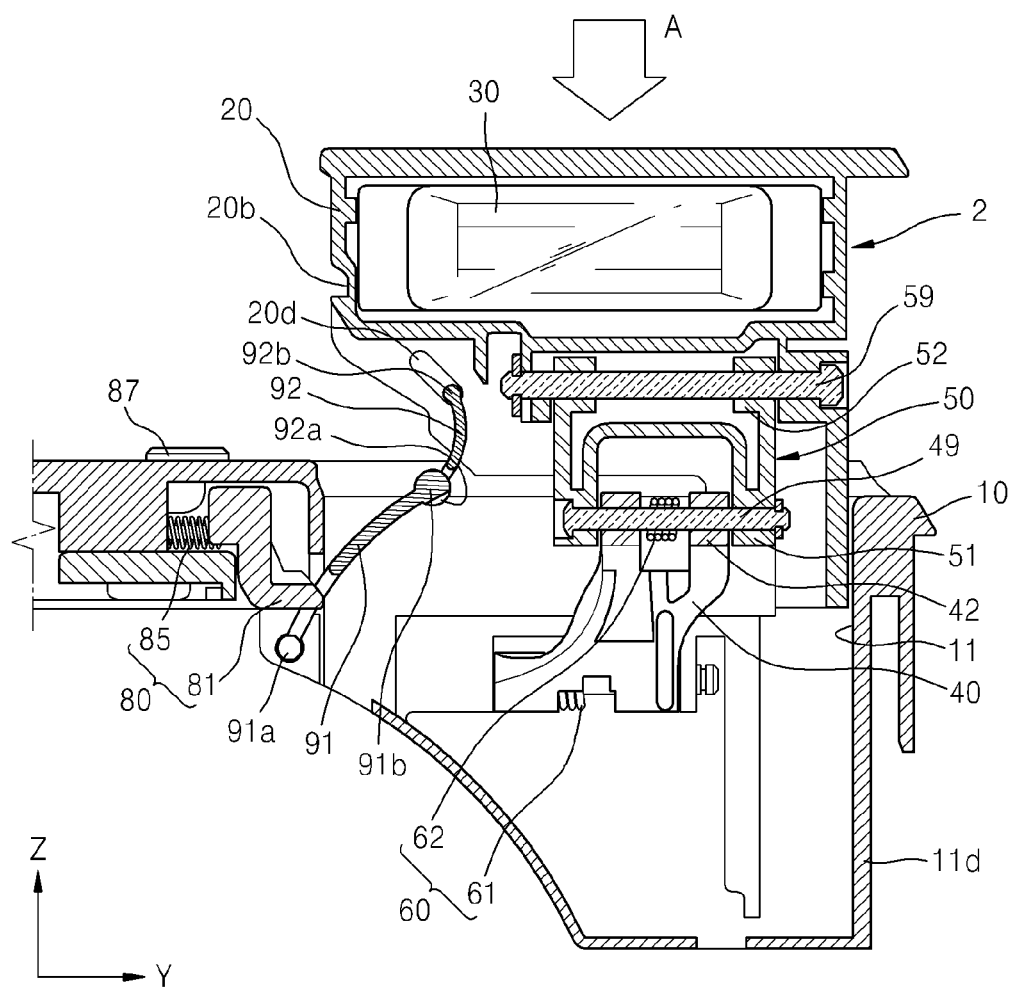
FIG. 8 is a front cross-sectional view of the pop-up flash assembly of FIG. 7.

FIG. 7 is a side cross-sectional view of the pop-up flash assembly 2 of FIG. 2 during actuation, and FIG. 8 is a front cross-sectional view of the pop-up flash assembly 2 of FIG. 7.

FIGS. 7 and 8 illustrate that the moving unit 20 of the pop-up flash assembly 2 is located at the first position, thereby protruding from the opening 11. When the moving unit 20 and the flash 30 protrude from the opening 11, that is, when the moving unit 20 and the flash 30 are located in the first position, the flash 30 is exposed outside. When the flash 30 is exposed, photographing may be performed when light is emitted from the flash 30.

To move the moving unit 20 of the pop-up flash assembly 2 to the second position in which the moving unit 20 is received in the opening 11 after photographing is performed using the flash 30 of the pop-up flash assembly 2 that is located in the first position illustrated in FIGS. 7 and 8, a user may apply a pressure on upper end of the moving unit 20 in the direction of arrow A.

When the user moves the moving unit 20 downwards along the Z axis, the second link 50 and the first link 40 rotate to be in the state illustrated in FIG. 2. When the moving unit 20 is located in the second position, the protrusion 81 of the stopper 80 may be inserted through the coupling hole 20b of the moving unit 20, thereby allowing the moving unit 20 of the pop-up flash assembly 2 to be stably located in the second position.

Regarding the pop-up flash assembly 2, the moving unit 20 may move between the first position in which the moving unit 20 protrudes from the opening 11 and the second position in which the moving unit 20 is received in the opening 11. By using the link mechanism of the first link 40, the second link 50, and the moving unit 20, the maximum stroke for the protruding movement of the flash 30 from the camera 100 can be implemented.

Also, since the moving unit 20 is moved by using a link mechanism having a simple structure, the pop-up flash assembly 2 may be embodied as a compact structure which is more suitable for small and slim cameras compared to a more typical and complicated structure using a cam. Also, since the driver 60 for rotating the first link 40 and the second link 50 is embodied as a torsion spring, the pop-up motion of the pop-up flash assembly 2 may be stably performed and accompanying noise may be minimized.

Figure 9:
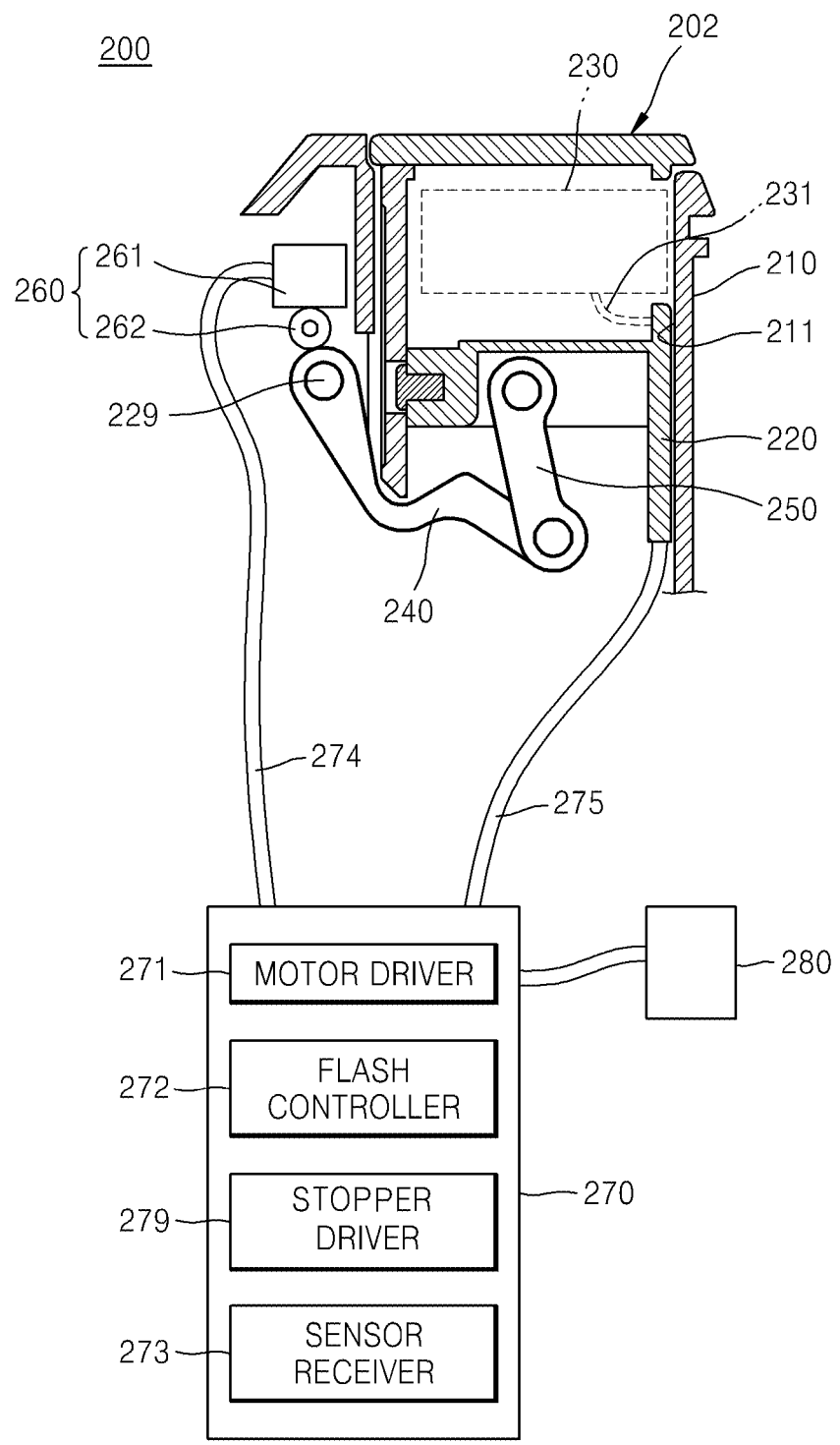
FIG. 9 is a schematic side sectional-view illustrating the relationship between a pop-up flash assembly according to another embodiment and constituent elements of a camera including the pop-up flash assembly.

FIG. 9 is a schematic side sectional-view illustrating the relationship between a pop-up flash assembly 202 according to another embodiment, and constituent members of a camera 200 including the pop-up flash assembly 202.

The camera 200 of FIG. 9 includes the pop-up flash assembly 202, a controller 270 for controlling the pop-up flash assembly 202, and a signal transferring unit 275 that electrically connects the controller 270 to the pop-up flash assembly 202.

The pop-up flash assembly 202 includes a main body 210 having an opening 211, a moving unit 220 that is movably arranged in the main body 210 to be received in the main body 210 or to protrude from the main body 210, a flash 230 that is installed on the moving unit 220 and generates light, a first link 240 that moves the moving unit 220 with respect to the main body 210, a second link 250, and a driver 260.

The moving unit 220 may linearly move between a first position and a second position wherein the moving unit 220 is received in the opening 211 in the second position and the moving unit 220 protrudes from the opening 211 at the first position. The flash 230 may receive signals transmitted by the controller 270 through an interconnection line 231 and emit light.

The first link 240 is connected to the first rotational axis 229. Since a first rotational axis 229 is rotatably coupled to the main body 210, when the first rotational axis 229 rotates with respect to the main body 210, the first link 240 may also rotate with respect to the main body 210. The second link 250 may be rotatably coupled to the first link 240 and the moving unit 220.

The driver 60 for rotating the first link 240 includes a driving motor 261 for rotating the first rotational axis 229 to which the first link 240 is coupled, and a power transmitting unit 262 for transmitting a driving force of the driving motor 261 to the first rotational axis 229. The driving motor 261 may be embodied as, for example, a step motor, an ultrasonic motor, or a voice coil motor. Also, the power transmitting unit 262 may be embodied as, for example, a gear, a rubber roller, or a chain.

The controller 270 is electrically connected to the pop-up flash assembly 202 through signal transferring units 274 and 275, and transmits control signals to or receives them from the pop-up flash assembly 202 so as to control the pop-up flash assembly 202, and processes data.

The controller 270 may be embodied as a micro chip, or a circuit board including a micro chip, and elements that constitute the controller 270 may be embodied as software, an electronic circuit, or a micro chip installed inside the controller 270.

The controller 270 includes a motor driver 271 for controlling the driver 260, a flash controller 272 for controlling light-emission actuation of the flash 230, stopper driver 279, and a sensor receiver 273 for receiving sensor signals.

The controller 270 includes a motor driver 271 for controlling the driver 260, a flash controller 272 for controlling light-emission actuation of the flash 230, and a sensor receiver 273 for receiving sensor signals.

The camera 200 may include a condition detector 280 for detecting photographing conditions. Photographing conditions detected by the condition detector 280 include intensity of illumination, motion of a subject, a face of a person included in the subject, and a change of expression on the face of the person.

When detection signals transmitted by the condition detector 280 are transmitted to the sensor receiver 273 of the controller 270, the controller 270 determines whether a light-emission action of the flash 230 is needed and controls the pop-up flash assembly 202 correspondingly.

When the controller 270 determines that the flash 230 is needed to emit light, the controller 270 transmits corresponding signals to the pop-up flash assembly 202 to move the moving unit 220 to the second position. When the moving unit 220 protrudes from the opening 211, the flash controller 272 of the controller 270 controls the flash 230 to perform a light-emission action to provide to flash light for photographing. Regarding pop-up flash assemblies according to the above embodiments of the present invention and cameras including the pop-up flash assemblies, a moving unit may move linearly between a first position and a second position, wherein the moving unit is received in an opening at the second position and the moving unit protrudes from the opening at the first position. That is, by using a simple link mechanism using a first link, a second link, and the moving unit, a maximum pop-up stroke may be obtained when a flash unit protrudes from a camera. Also, since the moving unit moves by using a simple link mechanism, a compact pop-up flash assembly is provided that is suitable for small and slim cameras, as compared to more complicated structures using a cam.

Also, since a driver is embodied by using a torsion spring or a driving motor to rotate the first link and the second link, the pop-up motion of the pop-up flash assembly may be stably performed, and noise accompanying the pop-up motion may be minimized.

The device described herein may include a processor for storing program data and executing it, a memory for storing data, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed in one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pop-up flash assembly comprising:
   a main body comprising an opening;
   a moving unit that is inserted in the opening of the main body in such a manner that the moving unit linearly moves, without rotation, in a direction in which the opening extends and is movable between a first position and a second position, wherein the moving unit is received in the opening at the first position and a portion of the moving unit protrudes from the opening at the second position;
   a flash that is installed on the moving unit to move linearly with the moving unit, without rotation, and generates light;
   a first link that has an end that is rotatably coupled to the main body;
   a second link that has an end that is rotatably coupled to another end of the first link, and another end of the second link being rotatably coupled to the moving unit; and
   a driver for rotating the first link,
   wherein a size of the opening of the main body corresponds to a size of the moving unit such that the moving unit is restricted in the opening to move linearly, without rotation, in the direction in which the opening extends.

2. The pop-up flash assembly of claim 1, wherein the end of the first link is rotatably coupled to a rotational axis of the main body, and
   the driver comprises a first spring that is installed between the end of the first link and the rotational axis to provide a rotational force to the first link.

3. The pop-up flash assembly of claim 2, wherein the driver further comprises a second spring that is installed between the first link and the second link to provide a rotational force between the first link and the second link.

4. The pop-up flash assembly of claim 1, further comprising a stopper that is installed on the main body in such a manner that the stopper is movable between a coupling position in which the stopper is coupled to the moving unit to limit the motion of the moving unit in the opening and a separation position in which the stopper is separated from the moving unit.

5. The pop-up flash assembly of claim 4, wherein the stopper comprises
   a protrusion that is movable to protrude toward the opening through a coupling hole formed in a wall of the opening, and
   an elastic support that elastically supports the protrusion with respect to the main body.

6. The pop-up flash assembly of claim 1, wherein the end of the first link is connected to the rotational axis of the main body, and
   the driver comprises a driving motor for rotating the rotational axis.

7. The pop-up flash assembly of claim 6, wherein the driver further comprises a power transmitting unit that is coupled between the driving motor and the rotational axis to transmit a driving force.

8. The pop-up flash assembly of claim 1, further comprising:
   a third link that has an end that is rotatably coupled to the main body and rotates about a direction crossing a rotational axis of the first link; and
   a fourth link that has an end that is rotatably coupled to another end of the third link and another end of the fourth link being rotatably coupled to the moving unit, and rotates about a direction crossing a rotational axis of the first link.

9. The pop-up flash assembly of claim 8, wherein the moving unit has an extension hole supporting the other end of the fourth link to allow the other end of the fourth link to slide while rotating.

10. A camera comprising:
    a pop-up flash assembly comprising:
       a main body comprising an opening;
       a moving unit inserted in the opening of the main body to linearly move, without rotation, between a refracted position within the main body and a deployed position protruding from the opening of the main body;
       a flash that is installed on the moving unit to move linearly with the moving unit, without rotation and generates light;
       a first link with one end rotatably coupled to the main body;
       a second link with one end rotatably coupled to the other end of the first link, and the other end of the second link being rotatably coupled to the moving unit; and
       a driver for rotating the first link;
    a controller that supplies signals to the flash; and
    a signal transferring unit that electrically connects the controller and the flash, and transfers signals between the controller and the pop-up flash assembly, wherein a size of the opening of the main body corresponds to a size of the moving unit such that the moving unit is restricted in the opening to move linearly, without rotation, in the direction in which the opening extends.

11. The camera of claim 10, wherein the end of the first link is rotatably coupled to a rotational axis of the main body, and
the driver comprises a first spring that is installed between the one end of the first link and the rotational axis to provide a rotational force to the first link.

12. The camera of claim 11, wherein the driver further comprises a second spring that is installed between the first link and the second link to provide a rotational force therebetween.

13. The camera of claim 10, further comprising a stopper installed on the main body that is movable between a coupling position in which the stopper is coupled to the moving unit to limit the motion of the moving unit in the opening and a separation position in which the stopper is separated from the moving unit.

14. The camera of claim 13, wherein the stopper comprises
a protrusion that is movable to protrude toward the opening through a coupling hole formed in a wall of the opening, and
an elastic support that elastically supports the protrusion with respect to the main body.

15. The camera of claim 10, wherein the end of the first link is connected to the rotational axis of the main body, and
the driver comprises a driving motor for rotating the rotational axis.

16. The camera of claim 15, wherein the driver further comprises a power transmitting unit coupled between the driving motor and the rotational axis to transmit a driving power.

17. The camera of claim 10, further comprising:
a third link that has an end rotatably coupled to the main body and rotates about a direction crossing a rotational axis of the first link; and
a fourth link that has an end rotatably coupled to another end of the third link and another end of the fourth link being rotatably coupled to the moving unit, and rotates about a direction crossing the rotational axis of the first link.

18. The camera of claim 17, wherein the moving unit has an extension hole supporting the other end of the fourth link to allow the other end of the fourth link to slide while rotating.

19. The camera of claim 13, further comprising a stopper driver that generates a driving force to move the stopper between the coupling position and the separation position,
wherein the controller transmits control signals to the stopper driver to drive the stopper.

20. The camera of claim 19, further comprising a condition detector for detecting photographing conditions,
wherein the controller receives detection signals transmitted by the condition detector, and when operation of the flash is needed, the controller transits signals to the stopper driver to drive the stopper.

* * * * *

UNITED STATES PATENT AND TRADEMARK OFFICE
CERTIFICATE OF CORRECTION

| | | |
|---|---|---|
| PATENT NO. | : 8,744,259 B2 | Page 1 of 1 |
| APPLICATION NO. | : 13/693230 | |
| DATED | : June 3, 2014 | |
| INVENTOR(S) | : Tae-jin Yoon | |

It is certified that error appears in the above-identified patent and that said Letters Patent is hereby corrected as shown below:

IN THE CLAIMS:

In Claim 10, Column 10, lines 52-53, replace "a refracted position" with -- a retracted position --

Signed and Sealed this
Twenty-third Day of September, 2014

Michelle K. Lee
*Deputy Director of the United States Patent and Trademark Office*